United States Patent
Bell et al.

(10) Patent No.: US 7,106,372 B1
(45) Date of Patent: Sep. 12, 2006

(54) METHOD AND APPARATUS FOR PROGRAMMABLE COLOR BALANCE IN AN IMAGE SENSOR

(75) Inventors: Tonia Bell, Chandler, AZ (US); Cynthia Bell, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/322,321

(22) Filed: May 28, 1999

(51) Int. Cl.
*H04N 5/335* (2006.01)
*H04N 5/235* (2006.01)

(52) U.S. Cl. .................. 348/308; 348/302; 348/230.1; 348/241

(58) Field of Classification Search ............. 348/230.1, 348/308, 302, 241
See application file for complete search history.

(56) References Cited

U.S. PATENT DOCUMENTS

| | | | | |
|---|---|---|---|---|
| 3,971,065 A | * | 7/1976 | Bayer | 348/276 |
| 4,335,943 A | * | 6/1982 | Numata | 396/225 |
| 4,609,825 A | * | 9/1986 | Berger et al. | 250/578 |
| 4,709,259 A | * | 11/1987 | Suzuki | 348/280 |
| 5,105,264 A | * | 4/1992 | Erhardt | 348/282 |
| 5,251,021 A | * | 10/1993 | Parulski et al. | 358/500 |
| 5,272,535 A | * | 12/1993 | Elabd | 348/314 |
| 5,452,004 A | * | 9/1995 | Roberts | 348/301 |
| 5,519,514 A | * | 5/1996 | TeWinkle | 358/514 |
| 5,541,645 A | * | 7/1996 | Davis | 348/96 |
| 5,625,470 A | * | 4/1997 | Ueta et al. | 358/505 |
| 5,937,221 A | * | 8/1999 | Yamamoto et al. | 396/429 |
| 5,943,514 A | * | 8/1999 | Sato et al. | 396/96 |
| 6,046,444 A | * | 4/2000 | Afghahi | 250/208.1 |
| 6,133,862 A | * | 10/2000 | Dhuse et al. | 341/118 |
| 6,175,383 B1 | * | 1/2001 | Yadid-Pecht et al. | 348/302 |
| 6,433,822 B1 | * | 8/2002 | Clark et al. | 348/241 |
| 6,847,398 B1 | * | 1/2005 | Fossum | 348/296 |
| 2003/0193597 A1 | * | 10/2003 | Fossum et al. | 348/308 |

* cited by examiner

*Primary Examiner*—Lin Ye
(74) *Attorney, Agent, or Firm*—Blakely, Sokoloff, Taylor & Zafman LLP (57) ABSTRACT

An integrated circuit including a pixel sensor array having a set of pixel sensors arranged in a set of rows and a set of columns, the set of pixel sensors having a set of first color pixel sensors, a set of second color pixel sensors, and a set of third color pixel sensors. Each set of color pixel sensors is configured to allow independent integration times.

10 Claims, 5 Drawing Sheets

METHOD AND APPARATUS FOR PROGRAMMABLE COLOR BALANCE IN AN IMAGE SENSOR

FIELD OF THE INVENTION

This invention relates to digital image capture. More particularly, this invention is directed to a method and apparatus for programmable color balance in an image sensor.

BACKGROUND

Video and still image capture using a digital camera has become very prevalent. Video capture may be used for such applications as video conferencing, video editing, and distributed video training. Still image capture with a digital camera may be used for such applications as photo albums, photo editing, and compositing.

Figure 1:
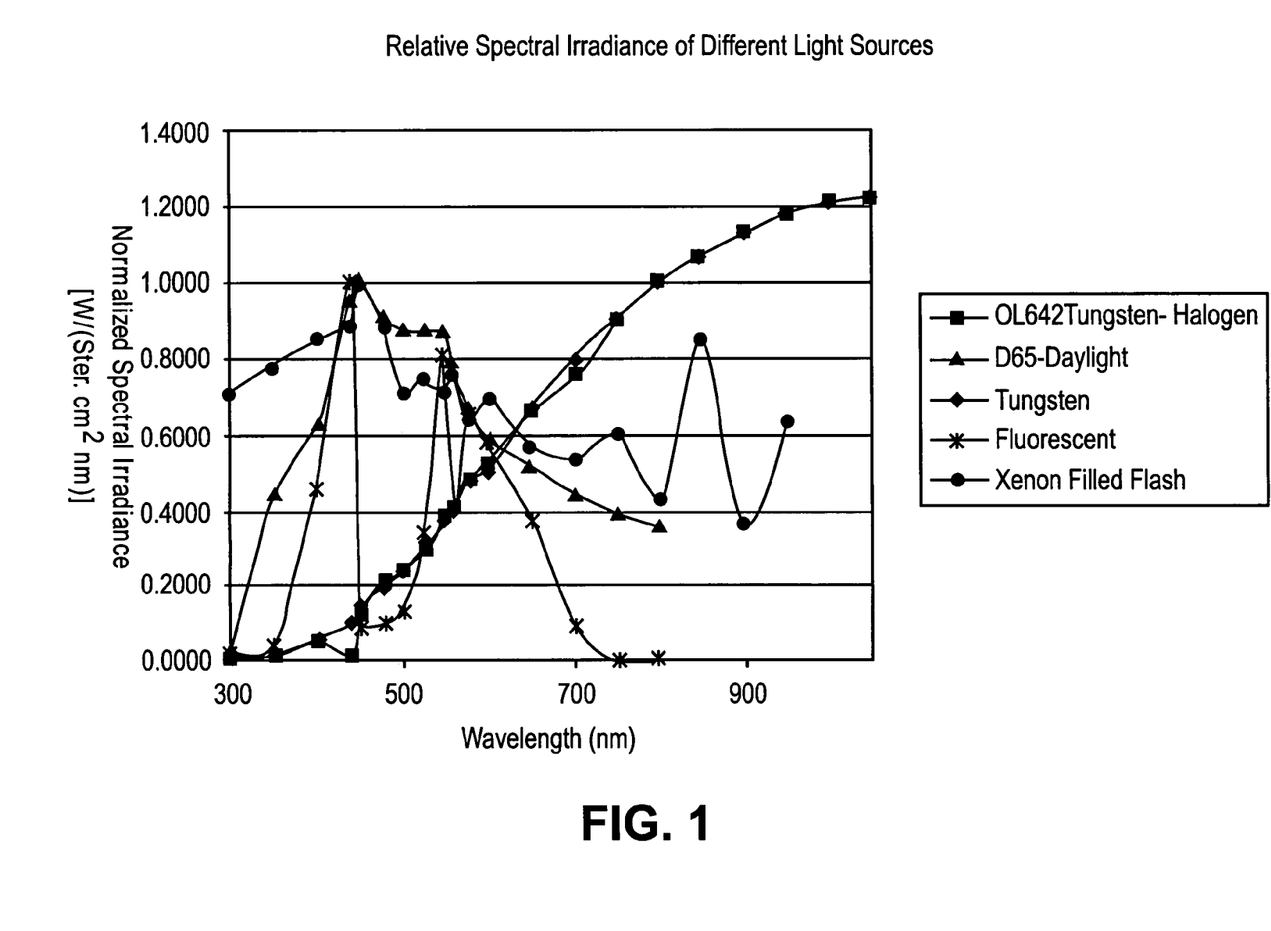
FIG. 1 is a spectral irradiance diagram of different light sources.

Digital cameras are typically expected to operate under a variety of scene illuminations. Some common illuminant conditions are fluorescent lighting, daylight, and tungsten illumination. These light sources have different spectral (wavelength) components, as shown in FIG. 1. For example, the tungsten light source has a stronger red wavelength component (approximately 600 nm–700 nm) compared to the blue wavelength component (approximately 400–500 nm), and green wavelength component (approximately 500–600 nm). In comparison, fluorescent lighting has stronger blue and green wavelength components with a relatively weaker red wavelength component.

Many digital video and still image capture systems use an image sensor that is constructed from a complementary metal oxide semiconductor (CMOS) process. CMOS technology offers the ability to integrate signal processing circuitry directly onto the sensor to achieve a lower system cost or to enable unique functionality within the sensor itself. The image sensing portion of a CMOS sensor is constructed of an array of light sensitive elements, each commonly referred to as a "pixel" element. Each pixel element is responsible for capturing one of three color channels: red, green, or blue. Specifically, each pixel element is made sensitive to a certain color channel through the use of a color filter placed over the pixel element such that the light energy reaching the pixel element is due only to the light energy from a particular spectrum. Each pixel element generates a signal that corresponds to the amount of light energy to which it is exposed.

The charge collected by each pixel element to form an image is determined by the illuminant's spectral energy components, the content of the scene, and the digital camera's photoresponsivity. To achieve the goal of reproducing the scene content for the user, the camera must remove the effects of the illuminant spectral components and the imaging module photoresponsivity. The camera photoresponsivity is stable and can be characterized during design or manufacturing. The scene illuminant, however, is variable and must be compensated for each time a picture is taken. Imaging across varying illuminant conditions requires careful exposure settings to capture good images in spite of the lighting component strength variability. Part of the challenge is in obtaining sufficient signal to noise ratio in the signals captured for each color channel of the camera. Color channel signal to noise ratio is fundamental to the final image color balance and accurate reproduction of color and tone under different illuminating conditions. Once the type of illuminant is determined through the use of methods such as flicker frequency (or "harmonics") detection (for detecting fluorescent lighting), pre-metering white balance (automatic gain control), or statistical analysis of sample data, then the correct exposure controls and algorithms can be applied ot obtain accurate colors in images.

Currently, image capture using sensors is such that all three color channels have the same integration time. With the same integration time being used for all color channels, captured images often result with many of the pixel elements of one color channel being saturated or, alternatively, having little signal, depending on the chosen integration time and the wavelength distribution for the illuminant. Thus, it is desirable to be able to control the integration of each color channel independently such that charge accumulation levels for the pixel elements of each color channel may be set independently.

SUMMARY OF THE INVENTION

An integrated circuit including a pixel sensor array having a set of pixel sensors arranged in a set of rows and a set of columns—the set of pixel sensors having a set of first color pixel sensors, a set of second color pixel sensors, and a set of third color pixel sensors. Each set of color pixel sensors is configured to allow independent integration times.

BRIEF DESCRIPTION OF THE DRAWINGS

The system is illustrated, by way of example and not limitation, in the figures of the accompanying drawings in which like references indicate similar elements and in which.

DETAILED DESCRIPTION

The present invention enables the balancing of the separate color channels within a sensor through the use of variable integration times for each color channel. In one embodiment, an active pixel sensor array is used with an integrating capture mechanism that allows independent resets of the pixel elements of each color channel. The sequencing of the reset and sample signals, for the start and finish, respectively, of the integration, are controlled independently for each color. It is assumed that a color filter array (CFA) is used in conjunction with the active pixel sensor array to designate the separate color channels.

The ability to change charge accumulation levels for each the color channel independently during capture (as opposed to applying gain during a post-processing stage) is an advantage in that the signal-to-noise ratio for the capture of each pixel element is optimized for each color channel independently. Specifically, pixel elements of a color channel that would have had very little signals due to lower intensity in that color channel would be allowed to integrate a longer period of time. Thus, the valid portions of the captured signals would be larger relative to the noise portion. The fact that the particular color channel was allowed a longer integration time may then be accounted for after capture by scaling the captured signal appropriately. Although it is desirable to have the ability to set charge accumulation levels independently for the pixel elements of each of the three color channels, pixel element size must be impacted in a minimal way.

In one embodiment, the arrangement for the CFA is a Bayer pattern, which is demonstrated in the supporting figures. Each row in a Bayer pattern is composed of two colors, green and red or green and blue, which means that each row has one additional metal line routed along the extent. In contrast to many CMOS sensor arrays, two reset lines are used in order to create the independence of integration times among the three colors. Thus, only one additional metal line must be added for each row.

Three shift registers are included along the sides of the array to independently control the reset of each color channel-red, green and blue. In addition to these reset shift registers, a wordline (WL) shift register is used to control the read-out of each row of pixel elements. The reset shift registers receive a series of input bits, which can be programmed such that the reset occurs at some number of rows preceding the capture—e.g., WL enable—thus allowing programmability of the integration time for each color channel. This scenario indicates a "pipeline" mode of operation, where the data is captured one row at a time. The WL active bit progresses down the WL shift register, determining the endpoint for the integration of each row. Due to a need for correlated double sampling by reading out the reset value directly after the measured intensity value, at least one of the active reset bits (in every reset shift register) must always follow the WL active bit progression down the array. The color channel which has the longest integration time permissible uses a single reset bit to act as both the reset for providing the correlated double sampling values, and as the reset for the next integration period. The longest integration time also defines the frame rate. The other two color channels may have two active bits within the reset shift register.

In another embodiment, a common signal is used to control the capture of all the pixel elements. In this embodiment, the reset for all the pixel elements belonging to each of the color channels would be delayed accordingly, and an electronic shutter would be used to sample all pixel elements simultaneously. In this "snapshot" mode of operation, where all rows are sampled at once, only one reset shift register is necessary to provide a sampling trigger for correlated double sampling by resetting all pixel elements in the array at once. No other reset shift registers are needed since all the pixel elements in the entire array for a particular color channel are reset simultaneously through the use of a global reset signal for each color channel. The WL shift register is still used, since read-out of the captured values in the pixel sensor array is still performed on a per row basis. It is also possible to provide for the pipeline and snapshot modes of operation in the same system through appropriate multiplexing of the signal lines from the reset shift register and the global color channels reset signals.

Figure 2:
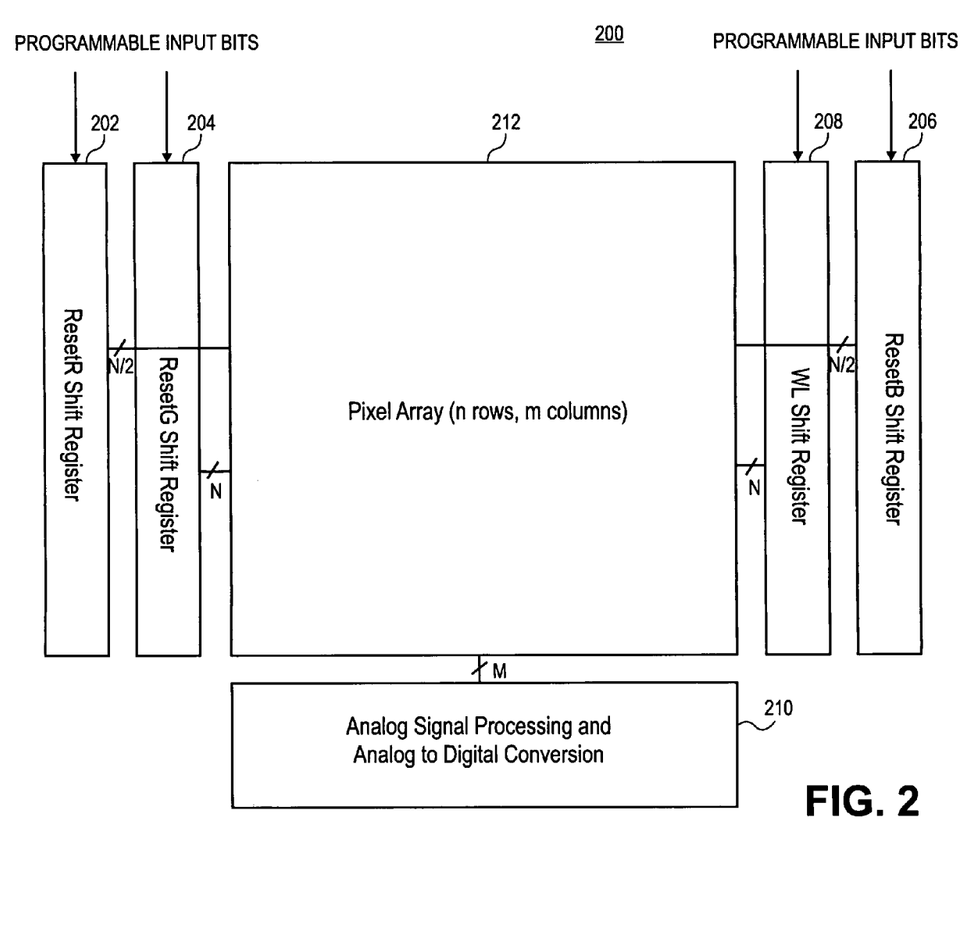
FIG. 2 is a block diagram of a programmable color balance capture system including a sensor array configured in accordance with one embodiment of the present invention.

FIG. 2 is a system level diagram for one embodiment of a programmable color balance capture system 200. Programmable color balance capture system 200 contains a ResetR shift register 202, a ResetG shift register 204, a ResetB shift register 206 and a wordline (WL) shift register 208 coupled to a pixel array 212. Programmable color balance capture system 200 also contains an analog signal processing and analog to digital (A/D) conversion unit 210.

Pixel array 212 contains an array of pixel elements arranged in N rows and M columns. As discussed in FIG. 3, below, all pixel elements in the same row have a common wordline. In addition, all pixel elements in the same row of the same color channel (e.g., all red pixel elements) have the same reset line. All pixel elements in the same column share a common output bitline, made possible as only one pixel element in each column is outputting a signal at any one time.

ResetR shift register 202, ResetG shift register 204, and ResetB shift register 206 are for controlling the reset of the pixel elements of the red channel, the green channel and the blue channel, respectively. The reset shift registers enable pixel array 212 to operate in a pseudo-pipeline mode. The reset shift registers may potentially have two active bits progressing down the chain, depending on the timing for the beginning of the integration time for capture. The first bit is used to reset the particular color channel to begin integration, which is the process of converting the light energy detected by the pixel element into electrical energy. The second bit is used in the reset shift registers when correlated double sampling is desired. The timing of the second bit is such that it follows the wordline enable bit.

Figure 3:
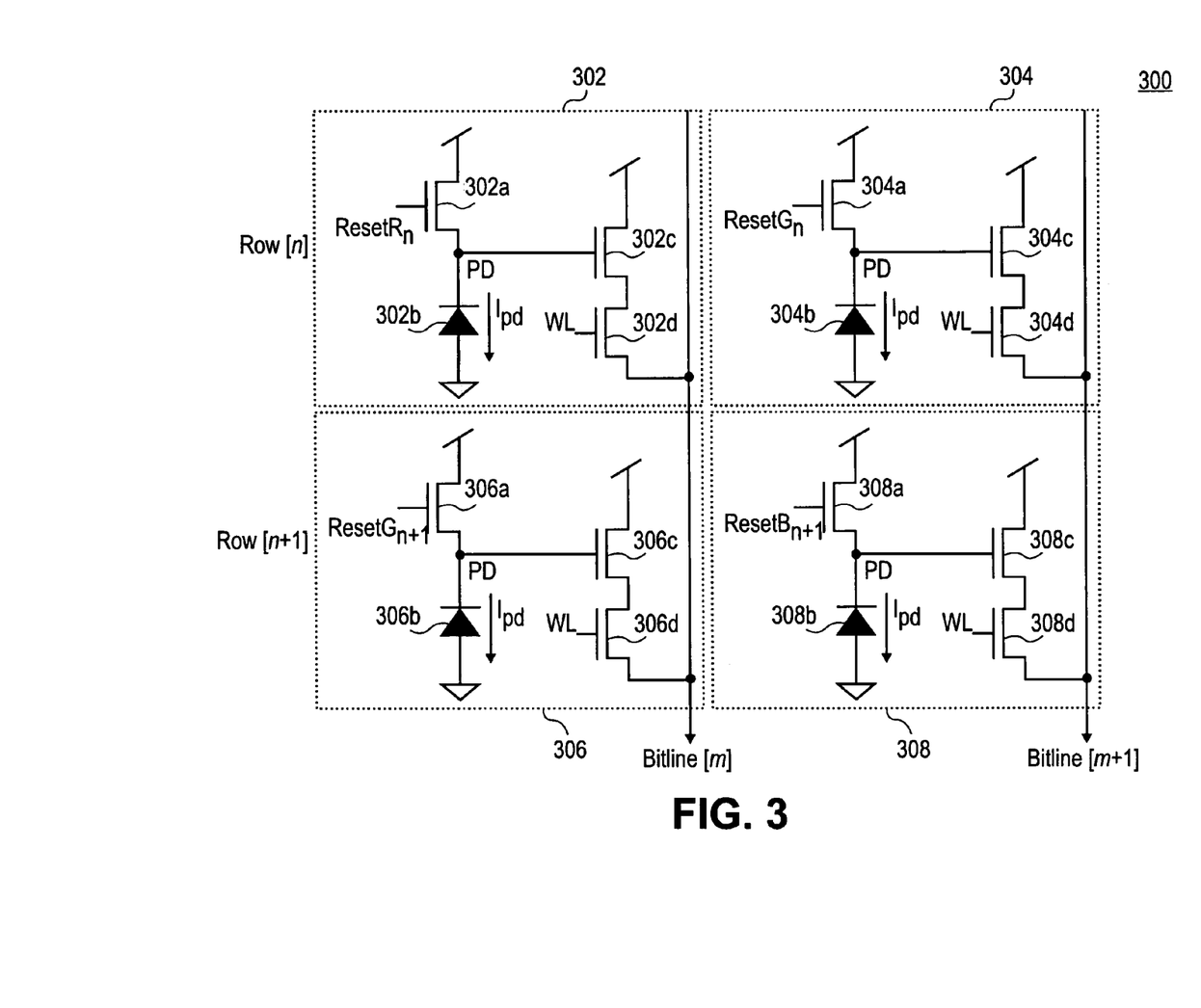
FIG. 3 is a circuit diagram illustrating an arrangement of four exemplary pixel elements within the sensor array of FIG. 2 configured in accordance with one embodiment of the present invention.

As will be detailed during the description of FIG. 3, if pixel array 212 has a Bayer pattern layout, then each row contains green pixel elements, and either red or blue pixel elements. Thus, each row contains only pixel elements for two colors: green and blue, or green and red. As pixel array 212 has N rows, and green pixel elements are on every row, ResetG shift register 204 has N bit locations with corresponding outputs. Specifically, the WL enable bit is present on the row long enough to read out the value captured by each of the pixel elements in the row and to read out the value of each of the pixel elements after the pixel elements have been reset by the arrival of the respective reset bit for the color channel in the row. Red and blue pixel elements exist on every other row, so ResetR shift register 202 and ResetB shift register 206 only has N/2 bit locations with corresponding outputs. In one embodiment, the shift registers are constructed with a set of register cells (e.g., memory cells).

In order to ensure proper timing is maintained, the clock driving the movement of the bits through ResetR shift register 202 and ResetB shift register 206 is preferably one-half the frequency of the clock that drives the movement of the bits through ResetG shift register 204 and WL shift register 208.

WL shift register 208 is used to contain the bit that controls the read-out of the captured charge for each row of pixel array 212. The captured charge is read-out onto a bitline shared by other pixel elements in the same column to analog signal processing and A/D conversion unit 210. The read-out is done on a per row basis as the bit proceeds through WL shift register 208. WL shift register 208 contains n bit locations with corresponding outputs. In one embodiment, WL shift register 208 is constructed with register elements similar to the reset shift registers.

In another embodiment, where the system is configured for operating in a snapshot mode, one global reset per channel is used for resetting all the pixel elements belonging to a particular color channel. Thus, a red global reset is used to reset the pixel elements of the red channel, a green global reset is used to reset the pixel elements of the green channel, and a blue global reset is used to reset the pixel elements of the blue channel, respectively. The global reset for each color is delayed according to the optimal integration time for the particular channel. Accordingly, the three global resets may be asserted at different times to allow the pixel elements for the color channels to begin integration at different times.

For read-out of the captured values, WL shift register 208 is still used in the same fashion as under the pipeline mode. The data in the pixel elements of each row are therefore read out on a per row basis as the bit progresses through WL shift register 208. A shift register is still necessary for asserting the second reset after the wordline assertion. Thus, if only the snapshot mode of capture is necessary, only one reset shift register is necessary, with the output of the reset shift register being multiplexed with the global reset controls for all colors.

FIG. 3 illustrates an arrangement 300 of four exemplary pixels in a Bayer pattern within pixel array 212. Arrangement 300 contains a red pixel element 302 and a green pixel element 304 on row n. Arrangement 300 also contains a green pixel element 306 and a blue pixel element 308 on row n+1. Each pixel element is identical in construction. For example, red pixel element 302 contains a reset transistor 302a, a photodiode 302b, a sample transistor 302c and a wordline (WL) transistor 302d. Each pixel element is limited to capturing a certain range of light energy by the color filter (not shown) that is placed on top of the pixel element to limit the wavelength of light energy that reaches the pixel element.

The necessary control signals for the different color channel resets are connected from the position of the shift register for that color channel to the respective reset transistors in the row. As each row of sensors contains two colors, the independence of integration times requires two reset lines to be used per row: one reset line for all the pixel elements of each color. Specially, in the embodiment where the pixel elements in pixel array 212 are arranged in a Bayer pattern, green pixel elements appear on all rows, while red pixel elements and blue pixel elements each appear on every other row. Thus, there needs to be one reset line per row for the green pixel elements of the row, and the second reset line per row is either for the red pixel elements of the row or the blue pixel elements of the row.

In FIG. 3, ResetR$_n$, which is the reset line for the red pixel elements in row n, is connected from position n in ResetR shift register 202 to reset transistor 302a and to the reset transistors of the other red pixel elements in row n (not shown). Similarly, ResetG$_n$, which is the reset line for the green pixel elements in row n, is connected from position n in ResetG shift register 204 to reset transistor 304a and to the reset transistors of the other green pixel elements in row n (not shown). For row n+1, ResetG$_{n+1}$, which is the reset line for the green pixel elements in row n+1, is connected from position n+1 in ResetG shift register 204 to reset transistor 306a and to the reset transistors of the other green pixel elements in row n+1 (not shown). Also, ResetB$_{n+1}$, which is the reset line for the blue pixel elements in row n+1, is connected from position n+1 in ResetB shift register 206 to reset transistor 308a and to the reset transistors of the other blue pixel elements in row n+1 (not shown).

The wordline (WL) enable signal is the same for all the pixel elements in each row as all the pixel elements in each row are read at the same time. Thus, each row has one wordline attached to the appropriate position in WL shift register 208. For row n, WL$_n$, which is the wordline connected to position n in WL shift register 208, is connected to both WL transistor 302d of red pixel element 302 and WL transistor 304d of green pixel element 304, in addition to being connected to all the other WL transistors of the pixel elements in row n. Similarly, WL$_{n+1}$ is connected to both WL transistor 306d of green pixel element 306 and WL transistor 308d of blue pixel element 308, in addition to being connected to all the other WL transistors of the pixel elements in row n+1.

A bitline is also used for read-out of the captured image signal in each pixel elements in a column of pixel array 212. Specifically, in FIG. 3, the bitline in each column is connected to the output of all the WL transistors for that column. For example, bitline$_m$, which is the bitline for column m, is connected to red pixel element 302 and green pixel element 306. Similarly, bitline$_{m+1}$, which is the bitline for column m+1, is connected to green pixel element 304 and blue pixel element 308. All pixel elements for a column share a bitline as pixel elements are read-out on a per row basis.

Figure 4:
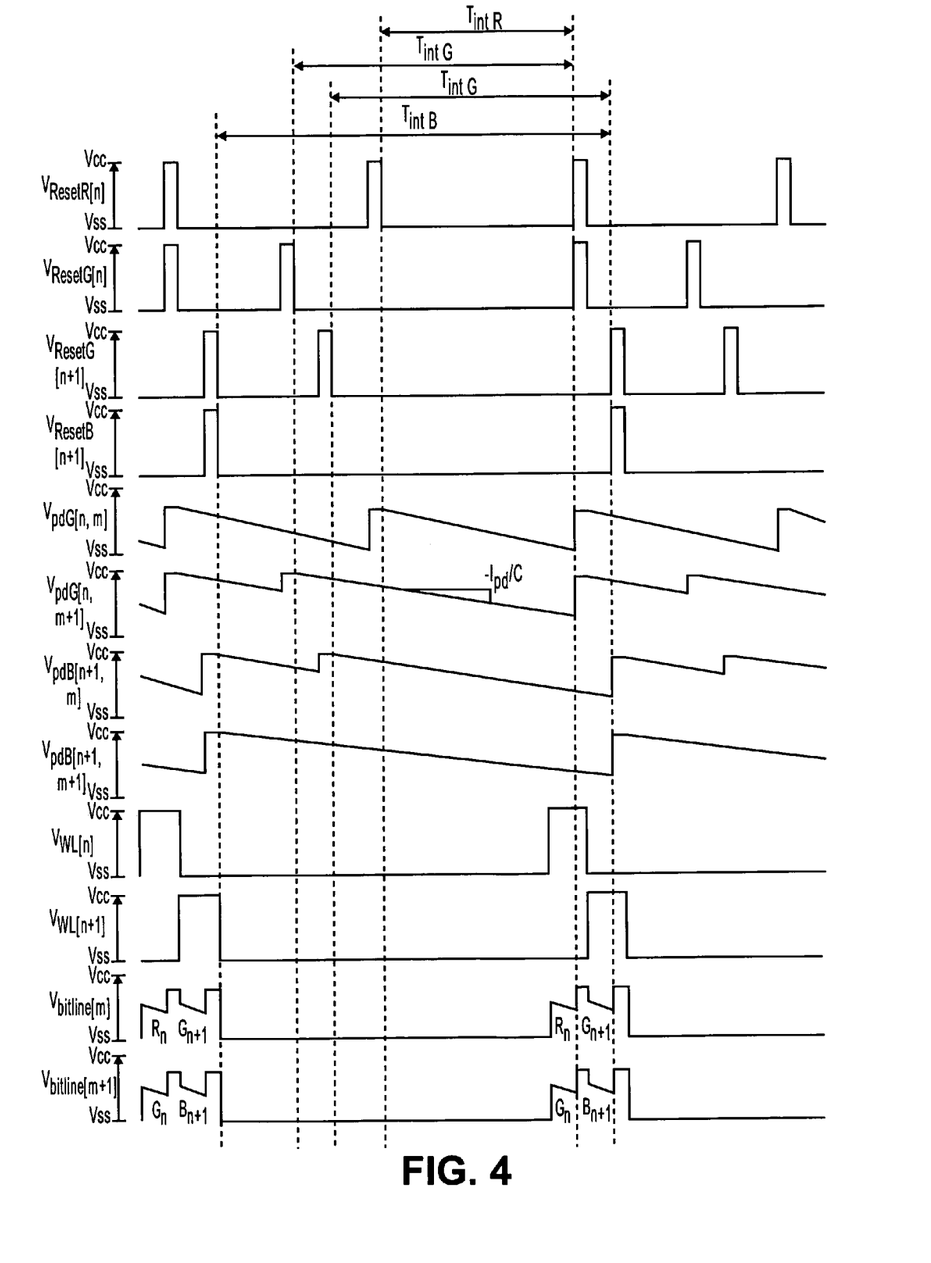
FIG. 4 is a timing diagram illustrating an exemplary sequencing of the control signals for the sensor array of FIG. 2 in accordance with one embodiment of the present invention.

FIG. 4 is a timing diagram illustrating an exemplary sequencing of the reset and wordline enable for pixel array 212, where:

$V_{ResetR[n]}$ is the voltage of the reset signal for the red pixel elements in row n (e.g., the voltage applied to reset transistor 302a in red pixel element 302);

$V_{ResetG[n]}$ is the voltage of the reset signal for the green pixel elements in row n (e.g., the voltage applied to reset transistor 304a in green pixel element 304);

$V_{ResetG[n+1]}$ is the voltage of the reset signal for the green pixel elements in row n+1 (e.g., the voltage applied to reset transistor 306a in green pixel element 306);

$V_{ResetB[n+1]}$ is the voltage of the reset signal for the blue pixel elements in row n+1 (e.g., the voltage applied to reset transistor 308a in blue pixel element 308);

$V_{pdR[n,m]}$ is the voltage across a photodiode in a particular red pixel element in row n (e.g., the voltage across photodiode 302b in red pixel element 302);

$V_{pdG[n,m+1]}$ is the voltage across a photodiode in a particular green pixel element in row n (e.g., the voltage across photodiode 304b in green pixel element 304);

$V_{pdG[n+1,m]}$ is the voltage across a photodiode in a particular green pixel element in row n+1 (e.g., the voltage across photodiode 306b in green pixel element 306);

$V_{pdB[n+1,m+1]}$ is the voltage across a photodiode in a particular blue pixel element in row n+1 (e.g., the voltage across photodiode 308b in blue pixel element 308);

$V_{WL[N]}$ is the voltage of the WL signal for all the pixel elements in row n (e.g., the voltage applied to WL transistor 302d in red pixel element 302 and WL transistor 304d in green pixel element 304);

$V_{WL[n+1]}$ is the voltage of the WL signal for all the pixel elements in row n+1 (e.g., the voltage applied to WL transistor 306d in green pixel element 306 and WL transistor 308d in blue pixel element 308);

$V_{bitline[m]}$ is the voltage of the bitline signal for column m (e.g., the voltage on bitline m);

$V_{bitline[m+1]}$ is the voltage of the bitline signal for column m+1 (e.g., the voltage on bitline m+1);

$T_{int\ R}$ is the integration time for red pixel elements;
$T_{int\ G}$ is the integration time for green pixel elements; and,
$T_{int\ B}$ is the integration time for blue pixel elements.

In this particular example, the integration time for the blue color channel ($T_{int\ B}$) is the longest and the integration time for the red color channel ($T_{int\ R}$) is the shortest. The resets for the red and green channels occur twice within each frame time, due to the need for correlated double sampling (and thus a readout of the reset value during the wordline enable for each respective row). There is only one reset for the blue channel. In this example, the blue channel has the longest integration time. The single blue reset bit performs the reset for correlated sampling and the reset for the beginning of the integration time.

As can be seen in FIG. 4, the beginning of the integration for the pixel elements of each color channels are different. However, the end of the integration time for each row (e.g., when the WL signal is asserted for read-out purposes of the integrated charge on each pixel element in a row), is the same. By being able to control the length of the integration time for each color channel, the color channels may be balanced differently depending on the environment under which the camera is operating, leading to better quality image captures.

Figure 5:
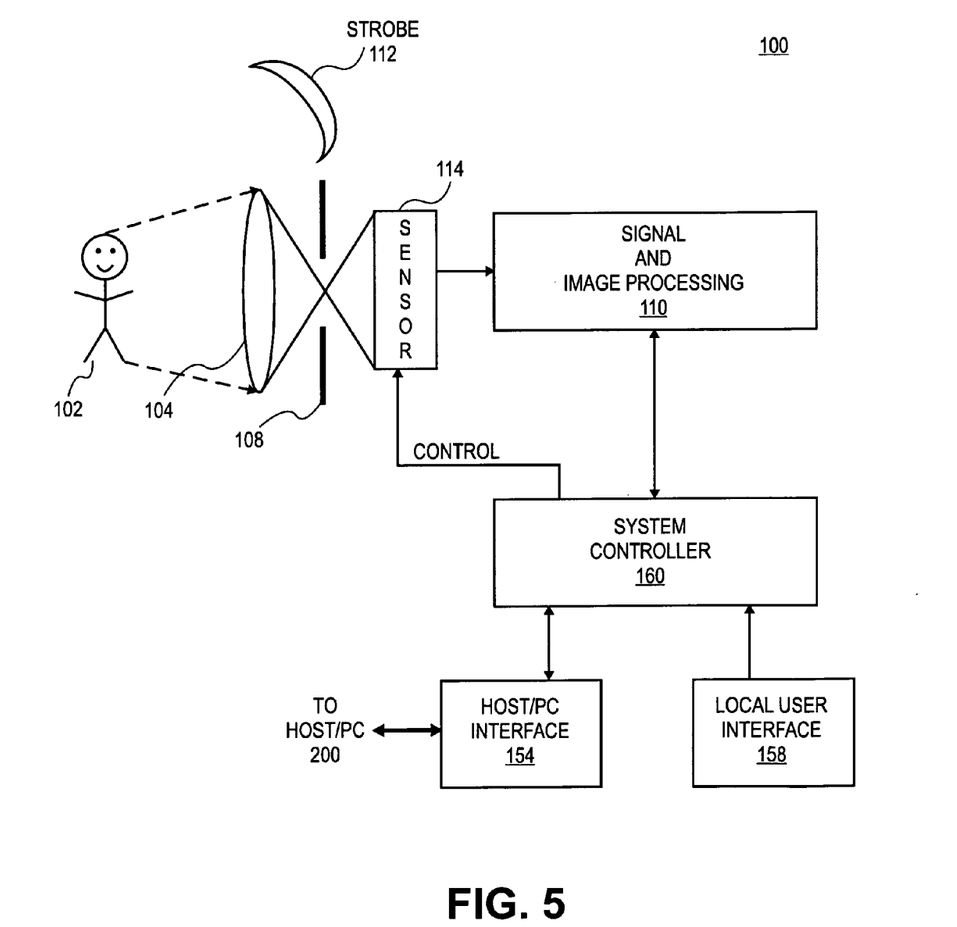
FIG. 5 is a block diagram of an imaging system configured in accordance with one embodiment of the present invention.

An embodiment of the invention as an imaging system 100 is shown as a logical block diagram in FIG. 5. Imaging system 100 includes a number of conventional elements, such as an optical system having a lens 104 and aperture 108 that is exposed to the incident light reflected from a scene or object 102. The optical system properly channels the incident light towards a sensor array 114 (e.g., programmable color balance capture system 200) that generates sensor signals in response to an image of object 102 being formed on sensor array 114. The various control signals used in the operation of sensor array 114, such as the bit generation signals for the shift registers and the clocking signals are generated by a system controller 160. System controller 160 may include a microcontroller or a processor with input/output (I/O) interfaces that generates the control signals in response to instructions stored in a non-volatile programmable memory. Alternatively, a logic circuit that is tailored to generate the control signals with proper timing can be used. System controller 160 also acts in response to user input via a local user interface 158 (as when a user pushes a button or turns a knob of system 100) or a host/PC interface 154 to manage the image capture and/or output operation of imaging system 100. As stated above, in a CMOS imager, system controller 160 may be contained on the same integrated circuit as sensor array 114 or on a separate integrated circuit.

In an alternate embodiment, the bits that are sent to the shift registers may be generated by a control circuit that is located on sensor array 114, and thus, system controller 160 is only used to determine the preferred integration times. In yet another embodiment, all circuitry needed to determine preferred integration times and generation of bits to the shift registers are located on sensor array 114.

To obtain images, a signal and image processing block 110 is provided in which hardware and software operates according to image processing methodologies to generate captured image data in response to receiving the sensor signals. Optional storage devices (not shown) can be used aboard system 100 for storing the captured image data. Such local storage devices may include a removable memory card. Host/PC interface 154 is included for transferring the captured image data to an image processing and/or viewing system such as a computer separate from imaging system 100, as described below. Imaging system 100 can optionally contain a display means (not shown) for displaying the captured image data. For instance, imaging system 100 may be a portable digital camera having a liquid crystal display or other suitable low power display for showing the captured image data.

In one embodiment, ResetR shift register 202, ResetG shift register 204, ResetB shift register 206, WL shift register 208 and analog signal processing and A/D conversion unit 210 are contained in sensor array 114. Analog signal processing and A/D conversion unit 210 is coupled to processing and image processing unit 110 to provide digital signals to signal processing and image processing unit 110. Pixel array 212 is contained in sensor 114, which also includes the CFA (not shown).

This invention would be used for programming different integration times (i.e., gains) for each color channel during the capture process. This would enable a more optimal signal-to-noise ratio value for all colors under each of the different lighting conditions, such as daylight, tungsten, and florescent. Such flexibility would enable the creation of a digital camera that exhibits high color quality in a range of environments.

Table 1 below lists an exemplary set of integration times for one embodiment of the present invention:

| Illuminant | Integration Times [msec] | | |
|---|---|---|---|
| | Red | Green | Blue |
| Daylight | 2.169 | 1.500 | 1.576 |
| Fluorescent | 18.898 | 12.000 | 19.685 |
| Tungsten | 13.113 | 16.358 | 33.000 |

A set of integration times is shown for each color channel based on the type of illuminant under which the camera is operating. For example, if the camera is operating in daylight, the integration time for the red, green, and blue color channels may be set to 2.169 ms, 1.500 ms, and 1.576 ms, respectively, in one embodiment of the present invention. In fluorescent lighting environments, the integration time for the red, green, and blue color channels may be set to 18.898 ms, 12.000 ms, and 19.685 ms, respectively. Where the lighting is provided by tungsten lamps, the integration time for the red, green, and blue color channels may be set to 13.113 ms, 16.358 ms, and 33.000 ms, respectively.

The independent integration times may also be achieved by using independent shift registers for the read-out of the signal and having a global reset signal (using a different timing for the output of each set of pixels in each different color channel instead of using a different timing for the reset of each set of pixels). In this embodiment, multiple WL shift registers are used and only one single reset shift register are used. The system may also be used in conjunction with a charge coupled detector (CCD) based sensor.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An integrated circuit comprising:
   a color sensor array having a plurality of sensor elements of different first and second colors, arranged in rows and columns;
   a first reset shift register having a plurality of outputs, each output being coupled to control a reset of sensor elements of the first color that are in a respective one of the rows of the array;
   a second reset shift register having a plurality of outputs, each output being coupled to control a reset of sensor elements of the second color that are in a respective one of the rows of the array;
   a wordline shift register having a plurality of outputs, each output being coupled to control a readout of all of the sensor elements that are in a respective one of the rows of the array; and control logic coupled to feed (a) each of the first and second shift registers with a first reset bit and a second reset bit and (b) the wordline shift register with a read bit, and to operate the reset and wordline shift registers so that the first and second reset bits and the read bit shift through their respective registers while an image frame is being captured, with the first reset bit being one or more rows ahead of the read bit to mark the start of integration, and the second reset bit to generate a correlated double sampling pixel reset value after each pixel integrated intensity value, and wherein integration time for first color and second color can be set independently by using the control logic to control timing of the first reset bit fed to each of the first and second reset shift registers.

2. The integrated circuit of claim 1 wherein the plurality of sensor elements of the color sensor array are of red, green, and blue colors, the first color being red and the second color being green.

3. The integrated circuit of claim 2 wherein the plurality of sensor elements are CMOS active pixel elements with an RGB color filter array that has a Bayer pattern, the sensor array having two reset metal lines for each row that are coupled to a respective pair of outputs of the first and second registers.

4. The integrated circuit of claim 1 further comprising a third reset shift register having a plurality of outputs, each output being coupled to control a reset of sensor elements of a third color, wherein the control logic is further coupled to feed the third reset shift register with only one reset bit, and wherein the sensor elements whose reset is controlled by the third reset shift register have the longest integration time of the array.

5. A system comprising:
a color sensor array having a plurality of sensor elements of different first and second colors, arranged in rows and columns, the elements of each column being coupled to share a respective one of a plurality of bitlines of the array;
a first reset shift register having a plurality of outputs, each output being coupled to control a reset of sensor elements of the first color that are in a respective one of the rows of the array;
a second reset shift register having a plurality of outputs, each output being coupled to control a reset of sensor elements of the second color that are in a respective one of the rows of the array;
a wordline shift register having a plurality of outputs, each output being coupled to control a readout of all of the sensor elements that are in a respective one of the rows of the array;
control logic coupled to feed (a) each of the first and second registers with a first reset bit and a second reset bit and (b) the wordline shift register with a read bit, and to operate the reset and wordline shift registers so that the first and second reset bits and the read bit shift through their respective registers while an image frame is being captured, with the first reset bit being one or more rows ahead the read bit to mark the start of integration, and the second reset bit to generate a pixel reset level after each pixel integrated intensity level generated by the read bit, and wherein the start of integration for the sensor elements of each color can differ by controlling timing of the first reset bit fed to each of the first and second reset shift registers;
signal and image processing circuitry coupled to the plurality of bitlines to digitize pixel levels produced by the sensor array;
a system controller coupled to control the sensor array and control logic so that pixel levels are read from the array one row at a time in accordance with the read bit, the controller being further coupled to control the signal and image processing circuitry to enable formation of a digital image file;
a host computer interface coupled to the system controller to pass the digital image file to a host computer; and
a local user interface of the system, being coupled to the system controller.

6. The system of claim 5 wherein the plurality of sensor elements of the color sensor array are of red, green, and blue colors, the first color being red and the second color being green.

7. The system of claim 6 wherein the plurality of sensor elements are CMOS active pixel elements with an RGB color filter array that has a Bayer pattern, the sensor array having two reset metal lines for each row that are coupled to a respective pair of outputs of the first and second registers.

8. The system of claim 5 further comprising a third reset shift register having a plurality of outputs, each output being coupled to control a reset of sensor elements of a third color, wherein the control logic is further coupled to feed the third reset shift register with only one reset bit, and wherein the sensor elements whose reset is controlled by the third reset shift register have the longest integration time of the array.

9. An integrated circuit comprising:
a color sensor array having a plurality of sensor elements of first color, second color and third color, arranged in rows and columns;
a first reset shift register having a plurality of outputs, each output being coupled to control a reset of sensor elements of the first color;
a second reset shift register having a plurality of outputs, each output being coupled to control a reset of sensor elements of the second color;
a third reset shift register having a plurality of outputs, each output being coupled to control a reset of sensor elements of the third color;
a readout shift register having a plurality of outputs, each output being coupled to control a readout of all of the sensor elements in a corresponding row; and
control logic coupled to each of the shift registers and the readout shift register, the control logic to control the reset shift registers and the readout shift register such that charge accumulation levels of the sensors elements of each of the three colors can be set independently, wherein the color sensor array has two reset metal lines for each row of the sensor elements to receive reset signals from the reset shift registers, the control logic is to feed two of the reset shift registers each with a pair of reset signals, and the readout shift register with a read signal, and operates the reset shift registers and readout shift registers so that the pair of reset signals and the read signal shift through their respective registers while an image frame is being captured, wherein one of the reset signals is one or more rows ahead of the read signal to mark the start of integration, and the other one of the reset signals is used to generate a correlated double sampling pixel reset value after each pixel integrated intensity value.

10. The integrated circuit of claim 9, wherein start of integration for the sensor elements of each color can differ by controlling timing of a rest signal sent to each of the reset shift register.

* * * * *